(12) United States Patent
Sprenger et al.

(10) Patent No.: US 6,415,930 B1
(45) Date of Patent: Jul. 9, 2002

(54) SEPARATOR CARTRIDGE

(75) Inventors: Gregory S. Sprenger; Michael J. Gish, both of Colorado Springs, CO (US)

(73) Assignee: Velcon Filters, Inc., Colorado Springs, CO (US)

( * ) Notice: Subject to any disclaimer, the term of this patent is extended or adjusted under 35 U.S.C. 154(b) by 0 days.

(21) Appl. No.: 09/580,707

(22) Filed: May 30, 2000

Related U.S. Application Data

(62) Division of application No. 09/310,684, filed on May 4, 1999, now Pat. No. 6,068,723, which is a continuation of application No. PCT/US97/20063, filed on Nov. 5, 1997
(60) Provisional application No. 60/030,222, filed on Nov. 7, 1996.

(51) Int. Cl.[7] .......................... B01D 39/16; B01D 39/20
(52) U.S. Cl. .................. 210/490; 210/491; 210/497.01; 210/499; 210/504; 210/505; 210/507; 210/508; 210/509
(58) Field of Search ................................ 210/315, 317, 210/483, 489, 490, 491, 498, 504, 507, 508, 509, DIG. 5, 497.01, 499, 505

(56) References Cited

U.S. PATENT DOCUMENTS

| | | | | |
|---|---|---|---|---|
| 2,746,607 A | * | 5/1956 | Hess | 210/509 |
| 2,911,101 A | * | 11/1959 | Robinson | 210/DIG. 5 |
| 3,399,516 A | * | 9/1968 | Hough et al. | 210/504 |
| 4,032,457 A | * | 6/1977 | Matchett | 210/509 |
| 4,052,316 A | * | 10/1977 | Berger et al. | 210/490 |
| 4,731,260 A | * | 3/1988 | Balding et al. | 210/508 |
| 4,836,931 A | * | 6/1989 | Spearman et al. | 210/489 |
| 4,861,634 A | * | 8/1989 | Renaud | 156/156 |
| 4,925,560 A | * | 5/1990 | Sorrick | 210/509 |
| 4,969,999 A | * | 11/1990 | Riddell | 156/218 |
| 4,983,434 A | * | 1/1991 | Sassa | 210/505 |
| 5,190,705 A | * | 3/1993 | Corazza | 156/294 |
| 5,472,606 A | * | 12/1995 | Steere et al. | 156/218 |
| 5,609,947 A | * | 3/1997 | Kamei et al. | 210/490 |

FOREIGN PATENT DOCUMENTS

WO    WO 98/19771   * 5/1991     B01D/39/16

* cited by examiner

Primary Examiner—Matthew O. Savage
(74) Attorney, Agent, or Firm—Donald R. Fraser

(57) ABSTRACT

A separator cartridge comprises a support screen comprising a substantially rigid reinforced plastic cylinder including an inner first major surface and an outer second major surface, a first nonwoven polymer layer adhered to the inner first major surface of the support screen, a second nonwoven polymer layer adhered to the outer second major surface of the support screen, and a polymeric screen contacting and frictionally engaging the second nonwoven polymer layer, the polymeric screen including a hydrophobic coating.

12 Claims, 1 Drawing Sheet

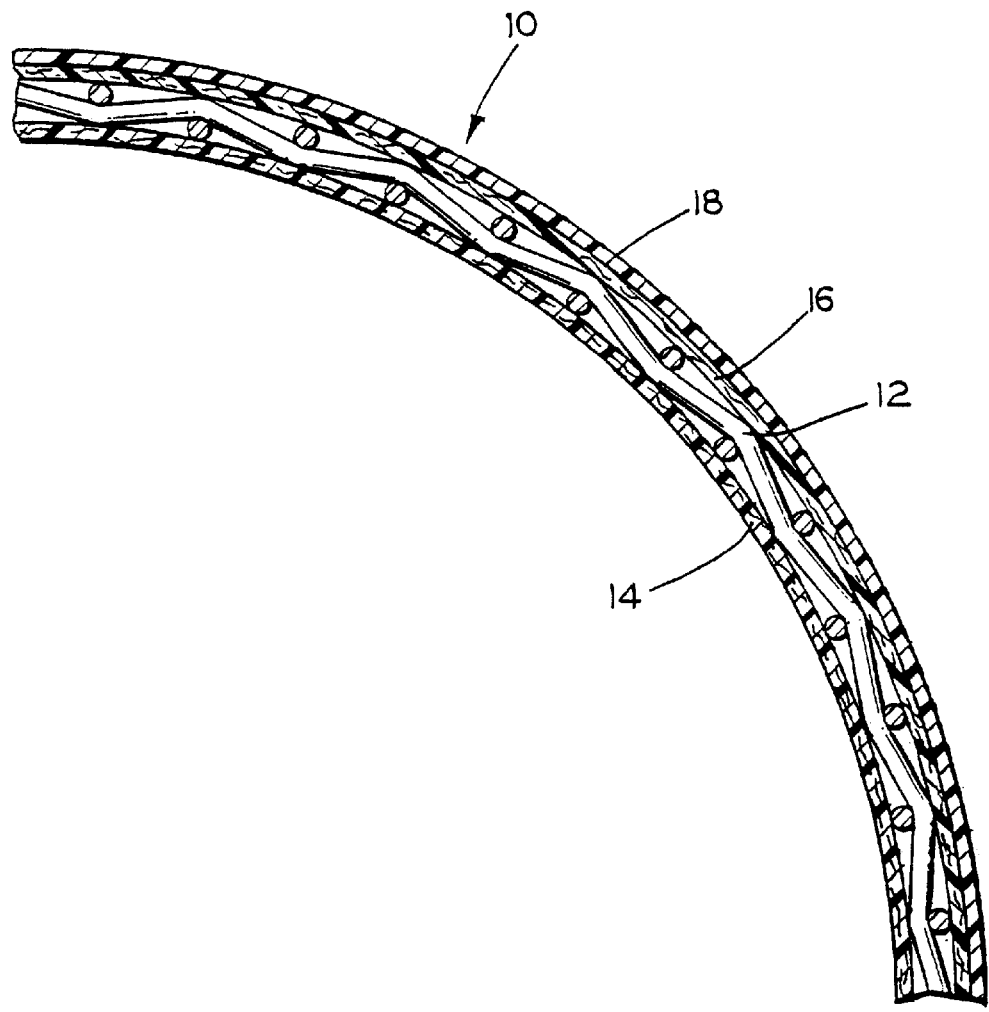

SEPARATOR CARTRIDGE

This application is a divisional application of U.S. utility patent application Ser. No. 09/310,684, filed May 4, 1999, now U.S. Pat. No. 6,068,723, which is a continuation of international application No. PCT/US/20063, filed Nov. 5, 1997 which claims the benefit of provisional patent application Serial No. 60/030,222, filed Nov. 7, 1996.

FIELD OF THE INVENTION

This invention relates generally to a hydrocarbon/water separator cartridge, and more particularly to a cylindrical, high throughput, plastic separator cartridge, the cartridge to be rigid and self-supporting.

BACKGROUND OF THE INVENTION

Filter/separators have been used in the aviation fueling industry for decades. These devices generally contain filter cartridges which also act either as a coalescer or separator. The separators of the prior art typically comprise a fluoropolymer coated onto a metal screen which has been formed into a cylinder. The fluorocarbon coating imparts water repellency to the filter, thereby causing the water to separate from the filtered stream. However, the process for applying the coating, as well as the fluoropolymer coating itself, continue to be relatively expensive.

In an effort to improve separators, while at the same time making them more cost effective, other screen materials have been utilized in the recent prior art devices. Specifically, screens made from plastic materials have been favored. Plastic screens may be formed with more threads per square inch than metal screens, due to smaller filament diameters and more efficient manufacturing methods. Moreover, alternative hydrophobic coatings applied to plastic screens are generally silicone-based compounds which are less expensive than fluoropolymers.

Unfortunately, the plastic screens used in conventional separators suffer from an inherent characteristic which affects their utilization; i.e., a plastic screen is extremely flexible. It must be mechanically supported within the separator device in order to perform the functions of filtration and water separation without collapsing under the pressure created by the flow of fluid therethrough. The plastic screen must be held in a smooth, taunt, cylindrical configuration. This is typically accomplished by placing the cylindrical plastic screen over a perforated metal tube. Of course, the metal tube must contain sufficient perforations to allow a high flow rate of fluid therethrough, but not have an excessive number of perforations that would allow the metal tube and surrounding screen to collapse under the pressure caused by the flowing fluid. Conventional separators which utilize a plastic screen over a metal tube employ a sheet metal tube perforated so as to create approximately 55 to 60 percent open area. It is difficult to form a metal tube having a greater amount of perforated area, which also retains the rigidity required to support a surrounding plastic screen under operating conditions.

It would be desirable to prepare a separator cartridge made from plastic which has a high throughput, does not require a limiting internal metal support tube, and is easy to manufacture.

SUMMARY OF THE INVENTION

Accordant with the present invention, there surprisingly has been discovered a separator cartridge embodying the desirable features set forth above. The separator cartridge comprises a support screen, comprising a substantially rigid reinforced plastic cylinder, the support screen including an inner first major surface and an outer second major surface; a first nonwoven polymer layer adhered to the inner first major surface of the support screen; a second nonwoven polymer layer adhered to the outer second major surface of the support screen; and a cylindrical polymeric screen contacting and frictionally engaging the second nonwoven polymer layer, the polymeric screen including a hydrophobic coating.

The separator cartridge is particularly useful for filtering and separating the water from a flowing stream of an organic liquid; such as for filtering and de-watering aviation or motor vehicle fuel, dielectric fluids, and the like.

BRIEF DESCRIPTION OF THE DRAWING

The novel features that are considered characteristic of the invention are set forth with particularity in the appended claims. The invention itself, however, will best be understood from the accompanying description of specific embodiments, when read in conjunction with the attendant drawing, in which:

The drawing is a partial, radial cross-sectional schematic view of a separator cartridge according to the present invention, illustrating the support screen, first and second nonwoven polymer layers, and polymeric screen.

DETAILED DESCRIPTION OF THE PREFERRED EMBODIMENTS

The invention is directed to a separator cartridge, comprising a support screen including a substantially rigid reinforced plastic cylinder, said support screen including an inner first major surface and an outer second major surface, a first nonwoven polymer layer adhered to the inner first major surface of the support screen, a second nonwoven polymer layer adhered to the outer second major surface of the support screen, and a polymeric screen contacting and frictionally engaging the second nonwoven polymer layer, said polymeric screen including a hydrophobic coating.

Referring now to the drawing there is shown at 10 a partial, radial cross-sectional schematic view of a separator cartridge according to the present invention. The separator cartridge 10 comprises a support screen 12, a first nonwoven polymer layer 14 adhered to the inner first major surface of the support screen 12, a second nonwoven polymer layer 16 adhered to the outer second major surface of the support screen 12, and a polymeric screen 18 contacting and frictionally engaging the second nonwoven polymer layer 16.

The support screen 12 is formed from a reinforced plastic prepreg, which is cured during the manufacture of the separator cartridge 10, thus forming a substantially rigid cylinder. Useful plastics for preparing the prepreg include, but are not necessarily limited to, phenolic resin, polycarbonate resin, polyester resin, polyamide resin, nylon resin, acetal resin, urethane resin, methacrylate resin, urea-formaldehyde resin, and the like, as well as blends and copolymers thereof. A preferred plastic comprises a phenolic resin. Useful reinforcements for preparing the prepreg according to the present invention include, but are not necessarily limited to, glass, ceramic, carbon, metal, and natural fibers, and synthetic fibers prepared from polycarbonates, polyesters, polyamides, etc., and the like, as well as combinations thereof. A preferred reinforcement comprises glass fibers. A suitable prepreg material may be obtained from Lewcott Corporation of Millbury, Mass.

under the product designation "55 CRX" which comprises a phenolic resin impregnated fiberglass mat having a ¼ inch by ¼ inch square weave. The cylindrical support screen includes an inner first cylindrical major surface and an outer second cylindrical major surface.

First and second nonwoven polymer layers 14 and 16 are adhered to the first and second major surfaces, respectively, of the cylindrical support screen 12. These nonwoven polymer layers 14 and 16 comprise nonwoven webs of polymer fibers. Suitable polymer fibers useful for making the polymer layers 14 and 16 include, but are not necessarily limited to, polyester, polycarbonate, acrylic, rayon, nylon, polyamide, and polyolefin fibers, as well as blends, copolymers, and combinations thereof. A preferred polymer fiber comprises polyester fiber. The first and second nonwoven polymer layers may be the same, or they may be different. Suitable first and second nonwoven polymer layer webs may be obtained from Remay, Inc., BBA Nonwovens of Hickory, Tenn. under the trade designation "REMAY POLYESTER SPUNBONDED 0.6 OZ/SQ. YD."

The first nonwoven polymer layer 14 is adhered to the inner first major surface of the cylindrical support screen 12, and the second nonwoven polymer layer 16 is adhered to the outer second major surface of the cylindrical support screen 12, by means of the tackiness of the plastic resin at the first and second cylindrical surfaces of the uncured prepreg. As the prepreg is cured, this plastic resin hardens, and the adhered first and second nonwoven polymer layers 14 and 16 become affixed to the cured surfaces of the cylindrical support screen 12.

The inner cylindrical surface of the polymeric screen 18 is positioned in contact with and frictionally engaging the second nonwoven polymer layer 16. The frictional fit between the cylindrical polymeric screen 18 and the second nonwoven polymer layer 16 insures that the polymeric screen 18 will not become detached from the rigid support screen 12 assembly during the operation of the separator 10. The polymeric screen 18 may be manufactured from woven and/or nonwoven polymer fibers. Suitable polymer fibers include, but are not necessarily limited to, polyester, nylon, polycarbonate, polyurethane, rayon, polyamide, and polyolefin fibers, as well as blends, copolymers, and combinations thereof. Preferred polymer fibers comprise polyester and nylon fibers. Useful polyester and nylon materials for constructing the polymeric screen 18 according to the present invention may be obtained from Saatitech of Stamford, Conn. under the trade designation "PES 55/31 255 MESH POLYESTER," and from Saatitech of Stamford, Conn. under the product designation "PA 52/32 280 MESH NYLON," respectively. Conveniently, the polymeric screen 18 includes a hydrophobic coating thereon, which may be applied by any conventional method such as, for example, dipping. The hydrophobic coating may be any material conventionally used to repel water. Preferred coatings comprise organosiloxane-based silicone coatings. A suitable coating may be obtained from Saatitech of Stamford, Conn. under the product designation "PBO Finish." The present invention also contemplates a process for preparing the separator cartridge. The process is begun by forming a cylindrical prepreg assembly. This prepreg assembly is constructed by forming a cylindrically-shaped reinforced plastic prepreg, said reinforced plastic prepreg including an inner first major surface and an outer second major surface, contacting and adhering a first nonwoven polymer layer to the inner first major surface of the reinforced plastic prepreg, and contacting and adhering a second nonwoven polymer layer to the outer second major surface of the reinforced plastic prepreg. The process is continued by forming a polymeric screen having a cylindrical configuration, said cylindrical polymeric screen having an inner diameter greater than the outer diameter of the cylindrical prepreg assembly, axially inserting the previously-formed cylindrical prepreg assembly into the cylindrical polymeric screen so as to cause the second nonwoven polymer layer to contact and frictionally engage the inner surface of the cylindrical polymeric screen, and curing the reinforced plastic prepreg.

Forming, then expanding and curing the cylindrical prepreg assembly within the cylindrical polymeric screen, is critical to the inventive process. The reinforced plastic prepreg, first nonwoven polymer layer, and second nonwoven polymer layer may be assembled in any conventional manner known to those ordinarily skilled in the art of laying-up plies of laminate materials. Preferably, the plies are assembled by overlaying the sheet materials on top of one another on a cylindrical mandrel. Conveniently, the mandrel may comprise a hollow, cylindrical, rubber, radially expandable mandrel, which may be radially expanded by increasing the air pressure in the cavity within the mandrel.

First, a first nonwoven polymer layer is wrapped around the unexpanded rubber mandrel. Next, a sheet of reinforced plastic prepreg material is contacted and adhered to the first nonwoven polymer layer wrapped around the mandrel, thereby overlaying the first nonwoven polymer layer. Thereafter, a second nonwoven polymer layer is wrapped over the sheet of reinforced plastic prepreg material, thereby contacting and adhering to the reinforced plastic prepreg material. The prepreg contains the reinforcing material and the full compliment of curable resin necessary for forming the substantially rigid reinforced plastic cylinder and adhering the first and second nonwoven polymer layers thereto upon subsequent curing. These three plies may be built-up in such a way that their ends overlap each other, rather than being butted together, so that there will be no voids in any of the three plies as the mandrel is radially expanded in a later operation.

Next, a polymeric screen, having a hydrophobic coating thereon, is formed into a cylindrical configuration. This may be accomplished simply by bringing the opposite edges of a rectangular portion of polymeric screen material together, and affixing the edges to one another such as, for example, by ultrasonic or solvent welding, sewing, or the like. The so-formed cylindrical polymeric screen must have an inner diameter greater, preferably only slightly greater, than the outer diameter of the cylindrical prepreg assembly residing on the unexpanded rubber mandrel. Thus, the cylindrical prepreg assembly, including the mandrel, may be inserted into the interior cylindrical cavity of the cylindrical polymeric screen. In a preferred embodiment of the inventive process, a rigid cylindrical metal sleeve, having an inner diameter slightly greater than the outer diameter of the cylindrical polymeric screen, is slid over the cylindrical polymeric screen which has the cylindrical prepreg assembly and mandrel inserted therein.

The cylindrical prepreg assembly is then radially expanded by pumping a gas into the cavity of the rubber mandrel. This action causes the second nonwoven polymer layer to contact and frictionally engage the inner cylindrical surface of the cylindrical polymeric screen. The cylindrical polymeric screen, in turn, is forced against the inner cylindrical surface of the cylindrical metal sleeve, which prevents the cylindrical polymeric screen form bursting under the pressure applied by the radially expanding mandrel.

The pressure within the radially expanded mandrel is maintained by a conventional flow value, and the radially expanded system is placed in a curing oven. Heat from the oven cures and hardens the prepreg into a substantially rigid support screen, thereby forming the separator cartridge according to the present invention. When the prepreg is completely cured, the expanded system is removed from the curing oven, the rubber mandrel is depressured to a diameter less than the diameter of the inner cylindrical surface of the first nonwoven polymer layer, and the mandrel is axially removed from the cylindrical cavity formed by the inner cylindrical surface of the separator cartridge. Finally, the separator cartridge, which has retracted away from the inner cylindrical surface of the metal sleeve as a result of the cooling of the separator cartridge and the removal of the strain caused by the radially expanded rubber mandrel, is removed from the cylindrical cavity of the metal sleeve.

It is observed that only a slight increase in the pressure within the radially expandable rubber mandrel is necessary to effect the proper expansion of the prepreg assembly. Typically, the required pressure ranges from 1 to 5 psig, depending upon the elasticity of the rubber mandrel. During radial expansion of the rubber mandrel, the reinforced plastic prepreg and first and second nonwoven polymer layers tighten at the lines of overlap, resulting in strong seams for these plies.

Generally, the curing oven is maintained at a temperature from about 275 degrees Fahrenheit to about 400 degrees Fahrenheit, depending upon several factors such as, for example, the curable resin used, the residence time within the oven, etc. During the curing process, the pressure within the rubber mandrel rises from about 2 to about 5 pounds per square inch.

For insertion into a conventional filter/separator apparatus, the separator cartridge according to the present invention may be fitted with a coaxial central metal tube for directing fluid flow away from the separator cartridge, and metal end caps and gaskets may be affixed to the circular ends of the separator cartridge.

Other methods for radially expanding the prepreg assembly within the cylindrical polymeric screen are well known to those ordinarily skilled in the art, and may be substituted for the radially expandable rubber mandrel described hereinabove. For example, a conventional mechanical radially expandable mandrel, such as is used for the build-up of resin and fiberglass plies for the manufacture of pipes and tanks, may be used.

The separator cartridge of the present invention exhibits a number of desirable characteristics as a result of the use of a cured reinforced plastic support screen: e.g., the support screen provides a high percentage of open area for increased fluid flow through the separator cartridge; the support screen provides a "rippled" surface which creates a greater effective percentage of open area (unlike a smooth piece of perforated sheet metal); the support screen filaments are oriented vertically and horizontally, thus, the vertical filaments provide end load strength while the circumferential filaments provide hoop strength to resist the force provided by the flowing fluid; and the support screen is cured under a strain that causes the cylindrical polymeric screen to be positioned taunt around the cured prepreg assembly.

From the foregoing description, one ordinarily skilled in the art can easily ascertain the essential characteristics of this invention and, without departing from its spirit or scope thereof, can make various changes and modifications to adapt the invention to various uses and conditions in accordance with the scope of the appended claims.

What is claimed is:

1. A separator cartridge, comprising:
   a cylindrical support screen formed from a substantially rigid reinforced plastic material, said support screen including a radially inner first major surface and a radially outer second major surface;
   a first nonwoven polymer layer adhered by said plastic material to the radially inner first major surface of said support screen;
   a second nonwoven polymer layer adhered by said plastic material to the radially outer second major surface of said support screen; and
   a cylindrical polymeric screen contacting and frictionally engaging a radially outer surface of the second nonwoven polymer layer, said polymeric screen including a hydrophobic coating.

2. The separator cartridge according to claim 1, wherein said support screen comprises plastic material selected from the group consisting of a cured phenolic resin, polycarbonate resin, polyester resin, polyamide resin, nylon resin, acetal resin, urethane resin, methacrylate resin, urea-formaldehyde resin, or a blends or copolymers thereof.

3. The separator cartridge according to claim 2, wherein said material is a cured phenolic resin.

4. The separator cartridge according to claim 1, wherein said support screen comprises reinforcements selected from the group consisting of glass fibers, ceramic fibers, metal fibers, carbon fibers, polycarbonate fibers, polyester fibers, polyamide fibers, or combinations thereof.

5. The separator cartridge according to claim 4, wherein said reinforcement is glass fibers.

6. The separator cartridge according to claim 1, wherein said first and second nonwoven polymer layers comprise fibers selected from the group consisting of polyester fibers, polycarbonate fibers, acrylic fibers, rayon fibers, nylon fibers, polyamide fibers, polyolefin fibers, or combinations thereof.

7. The separator cartridge according to claim 6, wherein said fibers are polyester fibers.

8. The separator according to claim 6, wherein said first and second woven polymer layers are formed from different materials.

9. The separator cartridge according to claim 1, wherein said polymeric screen comprises fibers selected from the group consisting of polyester fibers, nylon fibers, polycarbonate fibers, polyurethane fibers, rayon fibers, polyamide fibers, polyolefin fibers, or combinations thereof.

10. The separator cartridge according to claim 9, wherein said fibers are polyester fibers or nylon fibers.

11. The separator cartridge according to claim 1, wherein said hydrophobic coating comprises an organosiloxane-based silicone.

12. A separator cartridge, comprising:
   a cylindrical support screen formed from a substantially rigid fiberglass reinforced cured phenolic resin, said support screen including a radially inner first major surface and a radially outer second major surface;
   a first nonwoven polyester fiber layer adhered by said resin to the radially inner first major surface of said support screen;
   a second nonwoven polyester fiber layer adhered by said resin to the radially outer second major surface of said support screen; and
   a cylindrical polymeric screen comprising polyester fibers or nylon fibers, said polymeric screen contacting and frictionally engaging a radially outer surface of said second nonwoven polyester layer, said polymeric screen including an organosiloxane-based silicone coating.

* * * * *